UNITED STATES PATENT OFFICE.

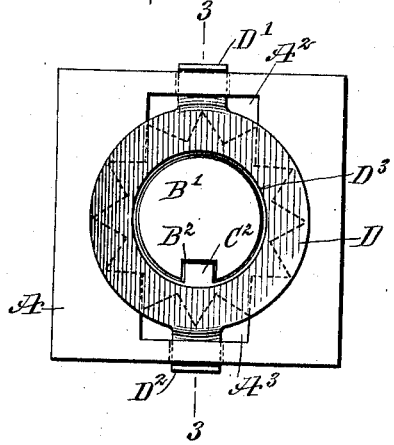
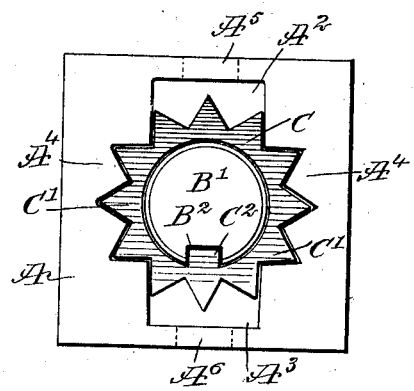
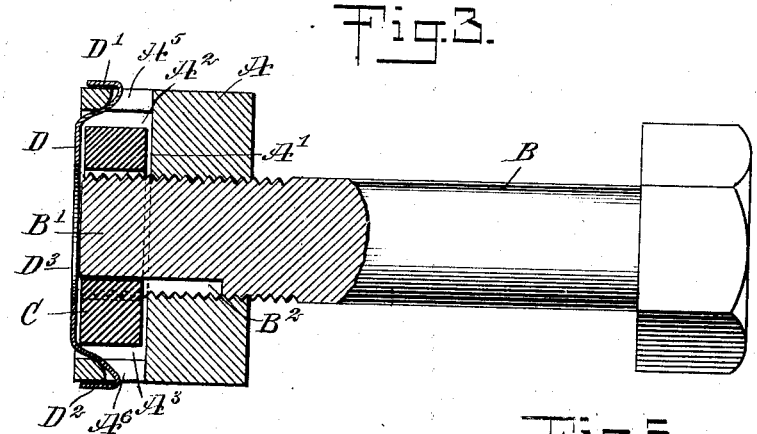
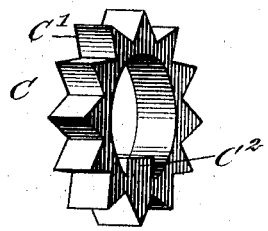
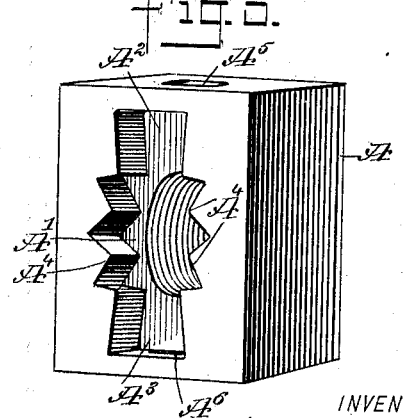

GEORGE WASHINGTON ROBERTS, OF MINERSVILLE, PENNSYLVANIA.

NUT-LOCK.

No. 850,787.  Specification of Letters Patent.  Patented April 16, 1907.

Application filed November 12, 1906. Serial No. 342,983.

*To all whom it may concern:*

Be it known that I, GEORGE WASHINGTON ROBERTS, a citizen of the United States, and a resident of Minersville, in the county of Schuylkill and State of Pennsylvania, have invented a new and Improved Nut-Lock, of which the following is a full, clear, and exact description.

The object of the invention is to provide a new and improved nut-lock for securely locking the nut in place after it is screwed up and to allow convenient unscrewing of the nut whenever it is desired to do so and without destroying any of the parts, thus permitting free use of the bolt, nut, and lock.

The invention consists of novel features and parts and combinations of the same, which will be more fully described hereinafter and then pointed out in the claim.

A practical embodiment of the invention is represented in the accompanying drawings, forming a part of this specification, in which similar characters of reference indicate corresponding parts in all the views.

Figure 1 is an end view of the improvement as applied. Fig. 2 is a like view of the same, showing the retaining-cover removed. Fig. 3 is a longitudinal sectional elevation of the same on the line 3 3 of Fig. 1. Fig. 4 is a perspective view of the locking member, and Fig. 5 is a similar view of the nut.

The nut A, of square, hexagonal, or other shape, screws on the threaded end B' of the bolt B, and in the outer face of the nut A is formed a recess A' for the reception of a locking member C, employed for holding the nut A against turning after the nut is screwed up on the threaded end B' of the bolt B. The recess A' is formed at diametrically opposite points with enlargements $A^2$ and $A^3$, and the wall of the recess A' between the said enlargements $A^2$ $A^3$ is formed with teeth $A^4$, into which mesh the teeth C' of the locking member C, sundry of the said teeth C' also extending into the enlargements $A^2$ and $A^3$, as plainly indicated in Fig. 2. The locking member C is provided with a central bore loosely fitting over the threaded end B' of the bolt B, and the wall of the said bore is provided with a key $C^2$, fitting a correspondingly-shaped keyway $B^2$, arranged lengthwise in the threaded end B' of the bolt B.

In using the nut-lock the nut A is first screwed up on the threaded end B' of the bolt B to final position, and when this has been reached the locking member C is slipped over the terminal of the threaded end B' and is engaged by its teeth C' with the teeth $A^4$ to hold the locking member C against turning. At the same time the key $C^2$ is engaged with the keyway $B^2$. Now when the several parts are in the position described the nut A is held against turning by the locking member C, as the latter is prevented from turning on the threaded end B' of the bolt B owing to the key $C^2$ engaging the keyway $B^2$.

In order to prevent the locking member C from accidentally dropping out of position, a retaining-cover D is provided, preferably made of tin or other sheet metal and having oppositely-disposed and outwardly-extending integral lugs D' $D^2$, adapted to pass into the enlargements $A^2$ $A^3$ and through apertures $A^5$ $A^6$ to the outside of the nut A; the said apertures extending from the outer face of the nut into the said enlargements $A^2$ $A^3$, as is plainly indicated in Fig. 3. The lugs D' $D^2$ after being passed through the apertures $A^5$ $A^6$ are bent over, as indicated in Fig. 3, to hold the retaining-cover in position across the front of the locking member C. The retaining-cover D is provided with a central aperture or bore $D^3$ sufficiently large to allow the convenient passage of the terminal of the end B'.

The nut-lock shown and described is very simple in construction and is composed of but few parts, not liable to easily get out of order.

In case it is desired to unscrew the nut A, it is only necessary for the operator to remove the retaining-cover D and then the locking member C to permit turning of the nut A on the threaded end B' of the bolt B.

The apertures $A^5$ $A^6$ are sufficiently large to permit the insertion of a screw-driver or other tool for loosening the locking member C whenever it is desired to remove the same.

Having thus described my invention, I claim as new and desire to secure by Letters Patent—

In a nut-lock, the combination of a bolt having a keyway, a nut screwing on the said bolt and having its outer face provided with a recess having enlargements at diametrically opposite points and with apertures leading from the said enlargements, the wall of the recess between the said enlargements being formed with teeth, a locking member having a smooth bore fitting over the end of the bolt and into the said nut-recess, the locking member having a key for engagement with the said keyway and the peripheral face of the said locking member being provided with teeth, sundry of which extend into the said enlargements, and the remaining teeth meshing with the said teeth on the nut, and a retaining-cover for the said locking member and having its ends provided with lugs extending into the said enlargements and out through the apertures in the nut and bent down upon the outside of said nut, the said retaining-cover having a central aperture for the passage of the threaded end of the bolt.

In testimony whereof I have signed my name to this specification in the presence of two subscribing witnesses.

GEORGE WASHINGTON ROBERTS.

Witnesses:
Mrs. MICHAEL HINKLE,
WILLIAM E. ROBERTS.